(12) United States Patent
Westman et al.

(10) Patent No.: US 7,747,564 B2
(45) Date of Patent: Jun. 29, 2010

(54) COMPARATIVE ANALYSIS OF BUSINESS INTELLIGENCE DATA

(75) Inventors: Randy Westman, Ottawa (CA); Stewart Winter, Metcalfe (CA); Andrew Liekucs, Nepean (CA); Todd MacCulloch, Ottawa (CA); Murray Reid, Munster (CA)

(73) Assignee: International Business Machines Corporation, Armonk, NY (US)

( * ) Notice: Subject to any disclaimer, the term of this patent is extended or adjusted under 35 U.S.C. 154(b) by 279 days.

(21) Appl. No.: 11/473,388

(22) Filed: Jun. 22, 2006

(65) Prior Publication Data

US 2007/0299860 A1 Dec. 27, 2007

(51) Int. Cl.
*G06F 7/00* (2006.01)
*G06F 17/00* (2006.01)

(52) U.S. Cl. ............... 707/603; 707/957; 707/958; 705/36 R; 715/209; 715/249; 715/853

(58) Field of Classification Search ............ 707/3, 707/7, 102, 999.003, 999.007, 999.102; 705/36 R; 715/209, 249, 853
See application file for complete search history.

(56) References Cited

U.S. PATENT DOCUMENTS

| | | | | |
|---|---|---|---|---|
| 4,769,772 A | * | 9/1988 | Dwyer | 707/2 |
| 5,604,854 A | * | 2/1997 | Glassey | 715/209 |
| 5,721,903 A | * | 2/1998 | Anand et al. | 707/5 |
| 6,557,011 B1 | * | 4/2003 | Sevitsky et al. | 707/104.1 |
| 6,581,068 B1 | * | 6/2003 | Bensoussan et al. | 707/104.1 |
| 6,750,864 B1 | * | 6/2004 | Anwar | 345/440 |
| 6,831,668 B2 | * | 12/2004 | Cras et al. | 715/853 |
| 7,187,401 B2 | * | 3/2007 | Alhadef et al. | 348/42 |
| 7,349,877 B2 | * | 3/2008 | Ballow et al. | 705/36 R |
| 2002/0013720 A1 | * | 1/2002 | Ozono et al. | 705/7 |
| 2002/0103807 A1 | * | 8/2002 | Yamashita | 707/101 |
| 2002/0133368 A1 | * | 9/2002 | Strutt et al. | 705/1 |
| 2004/0133855 A1 | * | 7/2004 | Blair et al. | 715/517 |
| 2004/0169688 A1 | * | 9/2004 | Burdick et al. | 345/854 |
| 2004/0181519 A1 | * | 9/2004 | Anwar | 707/3 |
| 2005/0076045 A1 | * | 4/2005 | Stenslet et al. | 707/101 |
| 2006/0085444 A1 | * | 4/2006 | Sarawgi et al. | 707/100 |
| 2006/0085445 A1 | * | 4/2006 | Thanu | 707/100 |
| 2006/0112070 A1 | * | 5/2006 | Ramos | 707/1 |
| 2007/0136155 A1 | * | 6/2007 | Chape et al. | 705/30 |

\* cited by examiner

*Primary Examiner*—Shahid A Alam
*Assistant Examiner*—Phong Nguyen
(74) *Attorney, Agent, or Firm*—Stephen R. Tkacs; Stephen J. Walder, Jr.; Erin C. Ming

(57) ABSTRACT

A definition manager independently defines a plurality of dimensional members of a data source. An operation manager receives user input selecting a set of dimensional members of interest and at least one operator to manipulate the selected set of members based on the selected at least one operator. The set of dimensional members of interest comprise a first dimensional member of interest having a given dimension and a given level in a hierarchy of the given dimension and a second dimensional member of interest having a different dimension from the given dimension or a different level in the hierarchy from the given level in the hierarchy. A display manager places the manipulated set of dimensional members in a report so that the manipulated set of dimensional members are displayed adjacently based on the operator to facilitate comparative analysis.

18 Claims, 13 Drawing Sheets

| Order Amount | Canada | United States | Digital2Go Americas |
|---|---|---|---|
| 2000 Q1 | 9,807,442.20 | 79,966,417.70 | 89,773,859.90 |
| 2001 Q1 | 19,026,907.25 | 108,350,150.44 | 127,377,057.69 |
| 2001/Nov | 13,401,000.44 | 43,980,393.22 | 57,381,393.66 |
| Total | 42,235,349.89 | 232,296,961.36 | 274,532,311.24 |

Figure 7

| Order Amount | Canada | United States | Digital2Go Americas |
|---|---|---|---|
| 2000 Q1 | 9,807,442.20 | 79,966,417.70 | 89,773,859.90 |
| 2001 Q1 | 19,026,907.25 | 108,350,150.44 | 127,377,057.69 |
| 2001/Nov | 13,401,000.44 | 43,980,393.22 | 57,381,393.66 |
| Total | 42,235,349.89 | 232,296,961.36 | 274,532,311.24 |
| 2001/Jan | 5,001,658.15 | 31,478,881.64 | 36,480,539.79 |
| Prior YTD | 19,026,907.25 | 108,350,150.44 | 127,377,057.69 |
| Total | 24,028,565.40 | 139,829,032.08 | 163,857,597.48 |

Figure 8

| Order Amount | | Canada | United States | Digital2Go Americas |
|---|---|---|---|---|
| 2000 Q 1 | Order Profit | 1,633,056.60 | 19,551,521.26 | 21,184,577.86 |
| | Order Cost | 7,635,985.60 | 53,775,196.44 | 61,411,182.03 |
| 2001 Q 1 | Order Profit | 174,787.64 | 18,568,238.24 | 18,743,025.87 |
| | Order Cost | 18,092,419.61 | 81,402,512.20 | 99,494,931.82 |
| 2001/Nov | Order Profit | 1,063,769.43 | 11,854,113.38 | 12,917,882.81 |
| | Order Cost | 10,986,131.01 | 27,977,879.84 | 38,964,010.85 |
| Total | Order Profit | 2,871,613.67 | 49,973,872.88 | 52,845,486.55 |
| | Order Cost | 36,714,536.22 | 163,155,588.48 | 199,870,124.70 |
| 2001/Jan | Order Profit | 792,076.42 | 10,891,644.53 | 11,683,720.95 |
| | Order Cost | 3,714,781.73 | 17,719,837.11 | 21,434,618.84 |
| Prior YTD | Order Profit | 174,787.64 | 18,568,238.24 | 18,743,025.87 |
| | Order Cost | 18,092,419.61 | 81,402,512.20 | 99,494,931.82 |
| Total | Order Profit | 966,864.06 | 29,459,882.77 | 30,426,746.82 |
| | Order Cost | 21,807,201.34 | 99,122,349.32 | 120,929,550.66 |

Figure 9

| Order Amount | | Canada | United States | Digital2Go Americas |
|---|---|---|---|---|
| 2000 Q1 | Order Profit | 1,633,056.60 | 19,551,521.26 | 21,184,577.86 |
| | Order Cost | 7,635,985.60 | 53,775,196.44 | 61,411,182.03 |
| 2001 Q1 | Order Profit | 174,787.64 | 18,568,238.24 | 18,743,025.87 |
| | Order Cost | 18,092,419.61 | 81,402,512.20 | 99,494,931.82 |
| 2001/Nov | Order Profit | 1,063,769.43 | 11,854,113.38 | 12,917,882.81 |
| | Order Cost | 10,986,131.01 | 27,977,879.84 | 38,964,010.85 |
| Total | Order Profit | 2,871,613.67 | 49,973,872.88 | 52,845,486.55 |
| | Order Cost | 36,714,536.22 | 163,155,588.48 | 199,870,124.70 |
| 2001/Jan | Order Profit | 792,076.42 | 10,891,644.53 | 11,683,720.95 |
| | Order Cost | 3,714,781.73 | 17,719,837.11 | 21,434,618.84 |
| Prior YTD | Order Profit | 174,787.64 | 18,568,238.24 | 18,743,025.87 |
| | Order Cost | 18,092,419.61 | 81,402,512.20 | 99,494,931.82 |
| Total | Order Profit | 966,864.06 | 29,459,882.77 | 30,426,746.82 |
| | Order Cost | 21,807,201.34 | 99,122,349.32 | 120,929,550.66 |
| AM | | 17,537.00 | 17,196,873.96 | 17,214,410.96 |
| AP | | 0.00 | 6,703,500.00 | 6,703,500.00 |
| Australia | | 17,537.00 | 23,900,373.96 | 23,917,910.96 |

Figure 10

|  |  | Canada | United States | Digital2Go Americas |
|---|---|---:|---:|---:|
| 2000 Q 1 | Order Profit | 1,633,056.60 | 19,551,521.26 | 21,184,577.86 |
|  | Order Cost | 7,635,985.60 | 53,775,196.44 | 61,411,182.03 |
| 2001 Q 1 | Order Profit | 174,787.64 | 18,568,238.24 | 18,743,025.87 |
|  | Order Cost | 18,092,419.61 | 81,402,512.20 | 99,494,931.82 |
| 2001/Nov | Order Profit | 1,063,769.43 | 11,854,113.38 | 12,917,882.81 |
|  | Order Cost | 10,986,131.01 | 27,977,879.84 | 38,964,010.85 |
| Total | Order Profit | 2,871,613.67 | 49,973,872.88 | 52,845,486.55 |
|  | Order Cost | 36,714,536.22 | 163,155,588.48 | 199,870,124.70 |
| 2001/Jan | Order Profit | 792,076.42 | 10,891,644.53 | 11,683,720.95 |
|  | Order Cost | 3,714,781.73 | 17,719,837.11 | 21,434,618.84 |
| Prior YTD | Order Profit | 174,787.64 | 18,568,238.24 | 18,743,025.87 |
|  | Order Cost | 18,092,419.61 | 81,402,512.20 | 99,494,931.82 |
| Total | Order Profit | 966,864.06 | 29,459,882.77 | 30,426,746.82 |
|  | Order Cost | 21,807,201.34 | 99,122,349.32 | 120,929,550.66 |
| AM | Average Order Amount | 4,384.25 | 554,737.87 | 491,840.31 |
|  | Average Order Profit | -390.50 | 221,982.89 | 196,568.79 |
|  | Average Order Cost | 4,349.75 | 280,809.81 | 249,214.38 |
| AP | Average Order Amount | 0.00 | 837,937.50 | 837,937.50 |
|  | Average Order Profit | 0.00 | 276,070.37 | 276,070.37 |
|  | Average Order Cost | 0.00 | 457,842.13 | 457,842.13 |
| Australia | Average Order Amount | 4,384.25 | 612,830.10 | 556,230.49 |
|  | Average Order Profit | -390.50 | 233,077.76 | 211,359.78 |
|  | Average Order Cost | 4,349.75 | 317,124.14 | 288,028.84 |

Figure 11

| Order Amount | | Canada | United States | Digital2Go Americas | Digital2Go Asia |
|---|---|---|---|---|---|
| 2000 Q1 | Order Profit | 1,633,056.60 | 19,551,521.26 | 21,184,577.86 | 8,631,917.46 |
| | Order Cost | 7,635,985.60 | 53,775,196.44 | 61,411,182.03 | 18,866,563.49 |
| 2001 Q1 | Order Profit | 174,787.64 | 18,568,238.24 | 18,743,025.87 | 13,386,837.66 |
| | Order Cost | 18,092,419.61 | 81,402,512.20 | 99,494,931.82 | 8,547,036.14 |
| 2001/Nov | Order Profit | 1,063,769.43 | 11,854,113.38 | 12,917,882.81 | 5,055,645.72 |
| | Order Cost | 10,986,131.01 | 27,977,879.84 | 38,964,010.85 | 9,359,610.84 |
| Total | Order Profit | 2,871,613.67 | 49,973,872.88 | 52,845,486.55 | 27,074,400.84 |
| | Order Cost | 36,714,536.22 | 163,155,588.48 | 199,870,124.70 | 36,773,210.48 |
| 2001/Jan | Order Profit | 792,076.42 | 10,891,644.53 | 11,683,720.95 | 2,978,218.51 |
| | Order Cost | 3,714,781.73 | 17,719,837.11 | 21,434,618.84 | 6,035,455.30 |
| Prior YTD | Order Profit | 174,787.64 | 18,568,238.24 | 18,743,025.87 | 13,386,837.66 |
| | Order Cost | 18,092,419.61 | 81,402,512.20 | 99,494,931.82 | 8,547,036.14 |
| Total | Order Profit | 966,864.06 | 29,459,882.77 | 30,426,746.82 | 16,365,056.17 |
| | Order Cost | 21,807,201.34 | 99,122,349.32 | 120,929,550.66 | 14,582,491.44 |
| AM | Average Order Amount | 4,384.25 | 554,737.87 | 491,840.31 | 56,844.01 |
| | Average Order Profit | -390.50 | 221,982.89 | 196,568.79 | 8,129.94 |
| | Average Order Cost | 4,349.75 | 280,809.81 | 249,214.38 | 42,380.73 |
| AP | Average Order Amount | 0.00 | 837,937.50 | 837,937.50 | 756,396.00 |
| | Average Order Profit | 0.00 | 276,070.37 | 276,070.37 | -95,672.14 |
| | Average Order Cost | 0.00 | 457,842.13 | 457,842.13 | 723,118.14 |
| Australia | Average Order Amount | 4,384.25 | 612,830.10 | 556,230.49 | 336,664.80 |
| | Average Order Profit | -390.50 | 233,077.76 | 211,359.78 | -33,390.89 |
| | Average Order Cost | 4,349.75 | 317,124.14 | 288,028.84 | 314,675.70 |

Figure 12

| Revenue | | Builders | Furniture | Department | Rental | Home | Market |
|---|---|---|---|---|---|---|---|
| 1993 | CA | 127295 | 87219 | 474880 | 68365 | 50424 | 808183 |
| | NY | 23320 | 8550 | 137877 | 27075 | 20129 | 216951 |
| | MA | 41208 | 14712 | 128979 | 0 | 24822 | 209721 |
| | State | 191823 | 110481 | 741736 | 95440 | 95375 | 1234855 |
| 1994 | CA | 265790 | 61255 | 450631 | 8395 | 62353 | 848424 |
| | NY | 24876 | 21593 | 177366 | 1540 | 6223 | 231598 |
| | MA | 66189 | 17540 | 93749 | 0 | 15647 | 193125 |
| | State | 356855 | 100388 | 721746 | 9935 | 84223 | 1273147 |
| Date | CA | 393085 | 148474 | 925511 | 76760 | 112777 | 1656607 |
| | NY | 48196 | 30143 | 315243 | 28615 | 26352 | 448549 |
| | MA | 107397 | 32252 | 222728 | 0 | 40469 | 402846 |
| | State | 548678 | 210869 | 1463482 | 105375 | 179598 | 2508002 |
| Dishwashers | CA | 207830 | 53777 | 319579 | 27930 | 39731 | 648847 |
| | NY | 13000 | 10420 | 82040 | 21190 | 1850 | 128500 |
| | MA | 69178 | 11930 | 74242 | 0 | 5460 | 160810 |
| | State | 290008 | 76127 | 475861 | 49120 | 47041 | 938157 |
| Stoves | CA | 98205 | 56677 | 334820 | 45365 | 53565 | 588632 |
| | NY | 11772 | 10557 | 165742 | 7425 | 4861 | 200357 |
| | MA | 33728 | 10680 | 91564 | 0 | 29139 | 165111 |
| | State | 143705 | 77914 | 592126 | 52790 | 87565 | 954100 |
| Microwaves | CA | 87050 | 38020 | 271112 | 3465 | 19481 | 419128 |
| | NY | 23424 | 9166 | 67461 | 0 | 19641 | 119692 |
| | MA | 4491 | 9642 | 56922 | 0 | 5870 | 76925 |
| | State | 114965 | 56828 | 395495 | 3465 | 44992 | 615745 |
| Line | CA | 393085 | 148474 | 925511 | 76760 | 112777 | 1656607 |
| | NY | 48196 | 30143 | 315243 | 28615 | 26352 | 448549 |
| | MA | 107397 | 32252 | 222728 | 0 | 40469 | 402846 |
| | State | 548678 | 210869 | 1463482 | 105375 | 179598 | 2508002 |

Figure 17

| Revenue | 2000 | 2001 | All Years |
|---------|------|------|-----------|
| Calgary | $ 2,542.23 | $ 3,050.68 | $ 5,592.91 |

Figure 18

| Revenue | 2000 | 2001 | All Years |
|---------|------|------|-----------|
| Calgary | $ 2,542.23 | $ 3,050.68 | $ 5,592.91 |
| Edmonton | $ 27,184.12 | $ 32,620.94 | $ 59,805.06 |

Figure 19

| Revenue | 2000 | 2001 | All Years |
|---------|------|------|-----------|
| Calgary | $ 2,542.23 | $ 3,050.68 | $ 5,592.91 |
| Edmonton | $ 27,184.12 | $ 32,620.94 | $ 59,805.06 |
| San Jose | $ 174.42 | $ 209.30 | $ 383.72 |

Figure 20

| Revenue | 2000 | 2001 | All Years |
|---------|------|------|-----------|
| Calgary | $ 2,542.23 | $ 3,050.68 | $ 5,592.91 |
| Edmonton | $ 27,184.12 | $ 32,620.94 | $ 59,805.06 |
| Canada | $ 50,000.00 | $ 60,000.00 | $110,000.00 |
| San Jose | $ 174.42 | $ 209.30 | $ 383.72 |
| USA | $100,000.00 | $120,000.00 | $220,000.00 |

Figure 21

| Revenue | 2000 | 2001 | All Years |
|---------|------|------|-----------|
| Calgary | $ 2,542.23 | $ 3,050.68 | $ 5,592.91 |
| Edmonton | $ 27,184.12 | $ 32,620.94 | $ 59,805.06 |
| Alberta | $ 29,726.35 | $ 35,671.62 | $ 65,397.97 |
| Canada | $ 50,000.00 | $ 60,000.00 | $110,000.00 |
| San Jose | $ 174.42 | $ 209.30 | $ 383.72 |
| California | $ 174.42 | $ 209.30 | $ 383.72 |
| USA | $100,000.00 | $120,000.00 | $220,000.00 |

Figure 22

| Revenue | 2000 | 2001 | All Years |
|---|---|---|---|
| Calgary | $ 2,542.23 | $ 3,050.68 | $ 5,592.91 |

Figure 23

| Revenue | 2000 | 2001 | All Years |
|---|---|---|---|
| Calgary | $ 2,542.23 | $ 3,050.68 | $ 5,592.91 |
| Edmonton | $ 27,184.12 | $ 32,620.94 | $ 59,805.06 |
| Alberta | $ 29,726.35 | $ 35,671.62 | $ 65,397.97 |

Figure 24

| Revenue | 2000 | 2001 | All Years |
|---|---|---|---|
| Calgary | $ 2,542.23 | $ 3,050.68 | $ 5,592.91 |
| Edmonton | $ 27,184.12 | $ 32,620.94 | $ 59,805.06 |
| San Jose | $ 174.42 | $ 209.30 | $ 383.72 |
| North America | $293,721.00 | $352,465.20 | $646,186.20 |

Figure 25

| Revenue | 2000 | 2001 | All Years |
|---|---|---|---|
| Calgary | $ 2,542.23 | $ 3,050.68 | $ 5,592.91 |
| Edmonton | $ 27,184.12 | $ 32,620.94 | $ 59,805.06 |
| Canada | $ 50,000.00 | $ 60,000.00 | $110,000.00 |
| San Jose | $ 174.42 | $ 209.30 | $ 383.72 |
| USA | $100,000.00 | $120,000.00 | $220,000.00 |
| North America | $293,721.00 | $352,465.20 | $646,186.20 |

Figure 26

| Revenue | 2000 | 2001 | All Years |
|---|---|---|---|
| Calgary | $ 2,542.23 | $ 3,050.68 | $ 5,592.91 |
| Edmonton | $ 27,184.12 | $ 32,620.94 | $ 59,805.06 |
| Alberta | $ 29,726.35 | $ 35,671.62 | $ 65,397.97 |
| Canada | $ 50,000.00 | $ 60,000.00 | $110,000.00 |
| San Jose | $ 174.42 | $ 209.30 | $ 383.72 |
| California | $ 174.42 | $ 209.30 | $ 383.72 |
| USA | $100,000.00 | $120,000.00 | $220,000.00 |
| North America | $293,721.00 | $352,465.20 | $646,186.20 |

Figure 27

COMPARATIVE ANALYSIS OF BUSINESS INTELLIGENCE DATA

FIELD OF THE INVENTION

The aspects of the invention relate to a system and method for comparative analysis of business intelligence data, and specifically to a system and method that provides a view of business intelligence data that facilitates comparative analysis of the data by users.

BACKGROUND OF THE INVENTION

In the Business Intelligence (BI) computer applications domain, business decision makers use analytical software to pose operational performance questions as queries against multi-dimensionally modeled business databases and data warehouses. These multi-dimensional models and analysis software tools are based on Online Analytic Processing (OLAP) concepts and technology. The analysis activity typically involves the creation and manipulation of a cross-tabular (also called "cross-tab") and/or graphical presentation of the data.

Large OLAP databases and multi-dimensionally modeled data warehouses typically contain large numbers of dimensional members or flat/non-existent dimensional hierarchies, or both. This is due to a variety of factors, including the volume of available and important data as a business operates and grows, the time constraints and computing resources required to stage and model the data warehouse and make it available for business decision-making processes, the need for flexible, unconstrained models for key business dimensions such as Customers and Time, or non-hierarchical models for inherently parent-child-relationship dimensions such as Invoices and Orders.

Multidimensional queries posed in this "large-OLAP" context often yield either a sparse results matrix due to the absence of data for many dimensional intersections as the number of dimensions or the number of members increases, or a large number of uninteresting children members, and sometimes both.

The problem is exacerbated by the physical display limits and two-dimensional nature of a computer monitor. Such an outcome makes it more difficult to compare relevant members, due to the 'distance' between them, either within the dimensional model or physically on the display.

Given these characteristics of large OLAP, it is often difficult to compare members from multiple different dimensions in the context of one or more additional dimensions on the opposite edge of a cross-tab. A user often needs to create separate views or reports for each of the members from multiple different dimensions, and compare them by switching between views or printed output of the report pages.

It is often difficult to compare members from different hierarchies of the same dimension in the context of one or more additional dimensions on the opposite edge of a cross-tab. Some existing BI tools allow different hierarchies of members from the same dimension to be displayed on opposite axes of the cross-tab. A disadvantage of this approach is that data may only appear for valid cell intersections. The opposite cross-tab axis can involve redundant members, and can no longer be dedicated to supplying additional context from other dimensions.

Where members of a repeating or parent-child hierarchy may have the same display caption but different parent-members, or reside in different hierarchies, it is difficult to discriminate them without additional decoration, e.g., a parent and/or hierarchy prefix. Such elaboration however takes up valuable display real estate, requiring word wrapping or cell resizing techniques and associated user interface fixtures to help manage the display. In some BI tools, user interface tooltips are used to display the fully-qualified path of the dimensional member, e.g., [Time].[2005].[2005 Q 1], or a separate user interface capability is invoked to elaborate additional explanatory details.

In these situations, it is difficult to compare members in the context of an additional dimension, or in the context of more than one measure value at a time. Some existing BI tools allow nesting of members from additional dimensions or multiple measures along one edge of a cross-tab. As the number of members or nesting levels increases, this approach suffers from the physical display limits and display management manipulations previously mentioned above. Some existing BI tools allow intervening members to be hidden or deleted from the cross-tab to improve the display proximity of the members being compared. For a large number of members, this technique can be tedious and time-consuming. Some existing BI tools allow cross-tab axis members to be 'pinned' (i.e., prevent them from being scrolled out of view) and ranges of intervening members to be collapsed (i.e., temporarily hidden) to improve the display proximity of the members being compared. Both techniques require numerous non-analytical user interface gestures that detract from the comparison activity. Display management manipulations or the need to print/arrange report outputs distract users from the primary task of comparative member analysis.

It is therefore desirable to provide a mechanism for allowing easy and accurate comparative analysis of BI data in reports.

SUMMARY OF THE INVENTION

In accordance with an illustrative embodiment, a method of providing comparative analysis of business intelligence data represented by a multi-dimensional model is provided. The method comprises independently defining, by a definition manager in a comparative analysis system, a plurality of dimensional members of a data source. The method further comprises receiving, by an operation manager in the comparative analysis system, user input selecting a set of dimensional members of interest and at least one operator to manipulate the selected set of members based on the selected at least one operator. The set of dimensional members of interest comprise a first dimensional member of interest having a given dimension and a given level in a hierarchy of the given dimension and a second dimensional member of interest having a different dimension from the given dimension or a different level in the hierarchy from the given level in the hierarchy. The method further comprises applying, by the operation manager, the at least one operator to the selected set of dimensional members of interest to form a manipulated set of dimensional members of interest, and placing, by a display manager in the comparative analysis system, the manipulated set of dimensional members in a report so that the manipulated set of dimensional members are displayed adjacently based on the operator to facilitate comparative analysis. Defining a plurality of dimensional members of a data source comprises translating a multi-dimensional model defining a report out as a binary operator tree into a layout oriented object model that defines the report layout in a positional operator tree.

In another illustrative embodiment, a computer program product comprises a computer recordable medium having a computer readable program recorded thereon. The computer readable program, when executed on a computing device, causes the computing device to independently define, by a definition manager in a comparative analysis system, a plurality of dimensional members of a data source, and receive, by an operation manager in the comparative analysis system, user input selecting a set of dimensional members of interest and at least one operator to manipulate the selected set of members based on the selected at least one operator. The set of dimensional members of interest comprise a first dimensional member of interest having a given dimension and a given level in a hierarchy of the given dimension and a second dimensional member of interest having a different dimension from the given dimension or a different level in the hierarchy from the given level in the hierarchy. The computer readable program further causes the computing device to apply, by the operation manager, the at least one operator to the selected set of dimensional members of interest to form a manipulated set of dimensional members of interest and place, by a display manager in the comparative analysis system, the manipulated set of dimensional members in a report so that the manipulated set of dimensional members are displayed adjacently based on the operator to facilitate comparative analysis. Defining a plurality of dimensional members of a data source comprises translating a multi-dimensional model defining a report layout as a binary operator tree into a layout oriented object model that defines the report layout in a positional operator tree.

In another illustrative embodiment, a comparative analysis system comprises a processor and a memory coupled to the processor. The memory comprises instructions which, when executed by the processor, cause the processor to independently define, by a definition manager, a plurality of dimensional members of a data source, and receive, by an operation manager, user input selecting a set of dimensional members of interest and at least one operator to manipulate the selected set of members based on the selected at least one operator. The set of dimensional members of interest comprise a first dimensional member of interest having a given dimension and a given level in a hierarchy of the given dimension and a second dimensional member of interest having a different dimension from the given dimension or a different level in the hierarchy from the given level in the hierarchy. The instructions further cause the processor to apply, by the operation manager, the at least one operator to the selected set of dimensional members of interest to form a manipulated set of dimensional members of interest, and place, by a display manager, the manipulated set of dimensional members in a report so that the manipulated set of dimensional members are displayed adjacently based on the operator to facilitate comparative analysis. Defining a plurality of dimensional members of a data source comprises translating a multi-dimensional model defining a report layout as a binary operator tree into a layout oriented object model that defines the report layout in a positional operator tree.

This summary of the invention does not necessarily describe all features of the invention.

BRIEF DESCRIPTION OF THE DRAWINGS

These and other features of the invention will become more apparent from the following description in which reference is made to the appended drawings wherein:

FIG. 7 is a diagram showing an example of a cross-tab;

FIG. 8 is a diagram showing another example of a cross-tab;

FIG. 9 is a diagram showing another example of a cross-tab;

FIG. 10 is a diagram showing another example of a cross-tab;

FIG. 11 is a diagram showing another example of a cross-tab;

FIG. 12 is a diagram showing another example of a cross-tab;

FIG. 17 is a diagram showing another example of a cross-tab;

FIG. 18 is a diagram showing another example of a cross-tab;

FIG. 19 is a diagram showing another example of a cross-tab;

FIG. 20 is a diagram showing another example of a cross-tab;

FIG. 21 is a diagram showing another example of a cross-tab;

FIG. 22 is a diagram showing another example of a cross-tab;

FIG. 23 is a diagram showing another example of a cross-tab;

FIG. 24 is a diagram showing another example of a cross-tab;

FIG. 25 is a diagram showing another example of a cross-tab;

FIG. 26 is a diagram showing another example of a cross-tab; and

FIG. 27 is a diagram showing another example of a cross-tab.

DETAILED DESCRIPTION OF PREFERRED EMBODIMENTS

Figure 1:
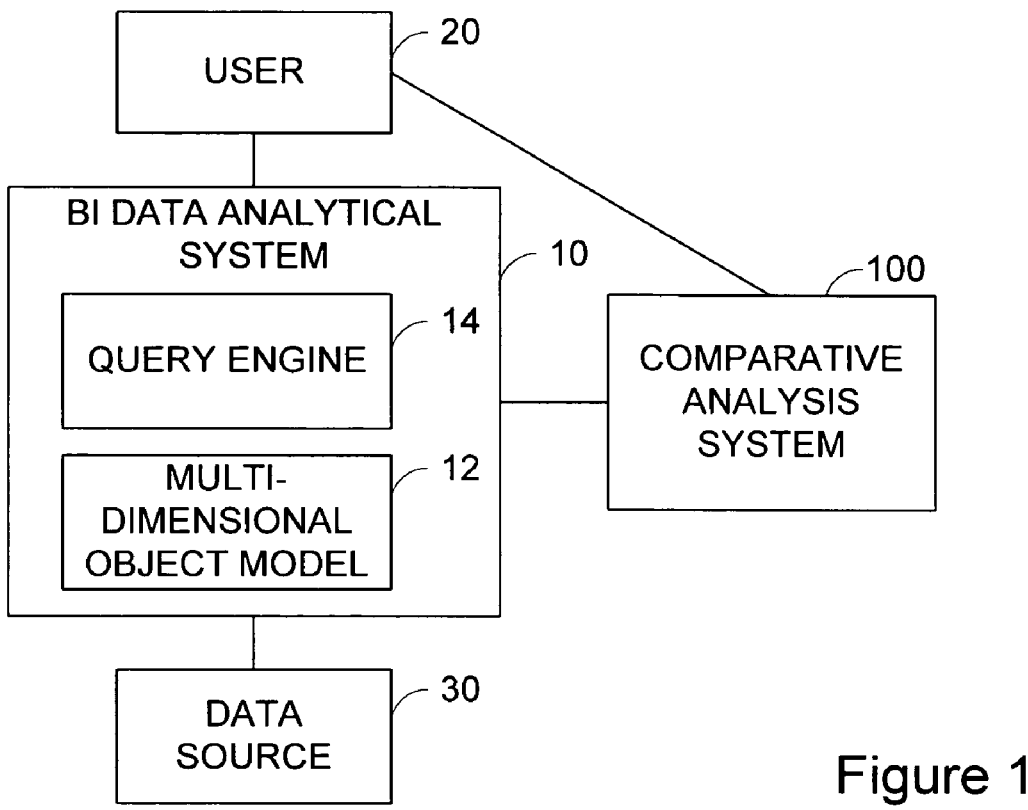
FIG. 1 is a block diagram showing environments of a comparative analysis system in accordance with an embodiment of the present invention.

Referring to FIG. 1, a comparative analysis system 100 in accordance with an embodiment of the invention is described.

The comparative analysis system 100 provides comparative analysis functions to a business intelligence (BI) analytical system 10. The BI analytical system 10 has a multi-dimensional model 12 that represents one or more data sources 30 storing BI data for an organization. Data stores 30 may be a multi-dimensionally modeled business databases and/or data warehouses. Users 20 query the BI analytical system 10 for analysing operational performance of the organization. In response to the queries, a query engine 14 of the BI analytical system 10 retrieves relevant BI data from the data sources 30 using the multi-dimensional model 12, and generates reports to present the relevant BI data to the users 20. The reports are typically presented in a form of cross-tabs or graphical representations of the data.

The BI analytical system 10 may be suitably implemented in various types of computer systems, including those in server-client environments. While FIG. 1 shows the comparative analysis system 100 as an independent element from the BI data analytical system 10, in a different embodiment, the comparative analysis system 100 may be provided as part of the BI data analytical system 10.

Figure 2:
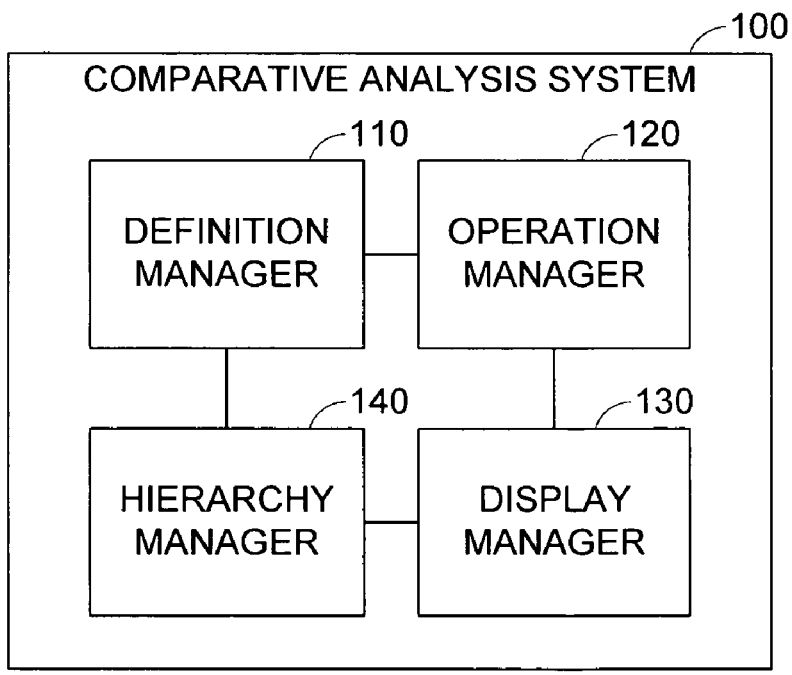
FIG. 2 is a block diagram showing an embodiment of the comparative analysis system.

As shown in FIG. 2, the comparative analysis system 100 has a definition manager 110, an operation manager 120, and a display manager 130. The comparative analysis system 100 may also have a hierarchy manager 140.

The definition manager 110 manages definition of each dimensional member of the data source 30 independently. The multi-dimensional model 12 typically contains various dimensions containing hierarchies having one or more levels. The definition manager 110 defines each dimensional member without relying on the definition of parent members in the hierarchy.

The operation manager 120 allows a user to select dimensional members of interest and one or more operators. Each dimensional member can be selected individually as it is defined independently from other members. Thus, the user can select members from same or different dimensions, at the same or different levels in the hierarchy in the multi-dimensional model 12.

The operation manager 120 applies the selected operators to the selected members or set of members. Members may be combined via a union operator, cross-product or crossjoin operator, or a dot-product (nest) operator.

Figure 3:
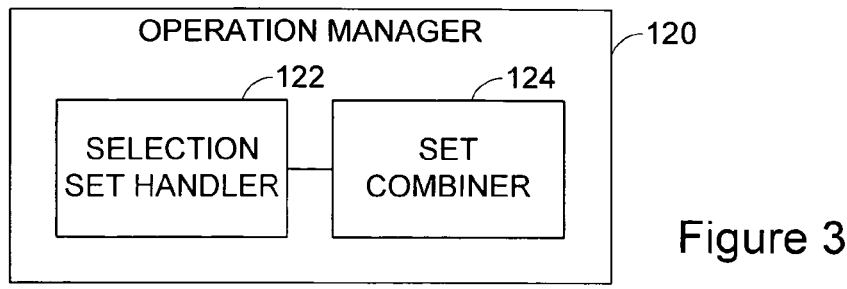
FIG. 3 is a block diagram showing an embodiment of an operation manager of the comparative analysis system.

The operation manager 120 may handle members as selection sets. As shown in FIG. 3, the operation manager 120 may have a selection set handler 122 and a set combiner 124. The selection set handler 122 and the set combiner 124 handle members by sets. The selection set handler 122 allows the user to individually select members from a single dimension either alone or in combination with other individual members, either at the same or different levels in the hierarchy, and add them to a selection set. Each selection set contains one or more selected members. The set combiner 124 applies the selected operators to the selection sets.

The display manager 130 manages placement of the selected members in a report based on the operators such that the selected members are displayed adjacently. The selected members may be presented as a cross-tab or a graphical representation of the data. The comparative analysis system 100 is described mainly using cross-tabs, but it also similarly applies to other graphical representations.

The display manager 130 can place members from a single dimension that are not adjacent to one another in their natural storage or display order, or are not from the same hierarchy within the dimension on a cross-tab adjacent to one another. Since the selected members are displayed adjacently, it is easy for the user to compare the selected members with each other. This is especially effective when queries are posed to the data source 30 which is a large OLAP database or multi-dimensionally modeled data warehouse.

Figure 4:
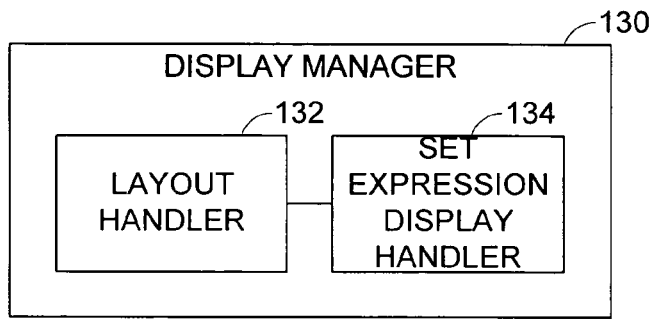
FIG. 4 is a block diagram showing an embodiment of a display manager of the comparative analysis system.

As shown in FIG. 4, the display manager 130 may have a layout handler 132 and a set expression display handler 134.

A set expression represents a collection of members from the same dimensional hierarchy. A "block" represents a visualization of a set expression. Set expressions are further broken down into "segments" that are non-intersecting portions of the collection of members represented by the set expression.

The layout handler 132 places the members of interest adjacently on a cross-tab axis. The layout handler 132 may enforce the following set of rules which governs the combination and placement of selection sets relative to other sets on a cross-tab axis. The set of rules includes (1) if present, a measure block can only appear on at most one axis of a cross-tab, where a measure block can contain one or more measures; and (2) in the presence of a union of blocks on an axis, zero or one measure blocks may appear in each unioned block, subject to the above rules.

The set expression display handler 134 allows users to choose to display the selected members with or without their associated related members visible. Thus, the display manager 130 can co-locate only those members of interest regardless of their dimensional origin or location in the dimensional hierarchy from the same or different dimension on a cross-tab axis, for the purpose of comparison.

Since the comparative analysis system 100 uses the selected members, it can provide more compact cross-tab views that better facilitate comparison of the relevant data than do prior art methods, without contravening the multi-dimensional query semantics that define the participating sets of members.

Since members are independently defined and individually selected, the comparative analysis system 100 can allow selection of members from different dimensions or different levels in a hierarchy, and combination of the selected members in asymmetrical axis configurations via unions and cross-products on one axis of a cross-tab. The comparative analysis system 100 can also nest different measures or sets of measures within an asymmetric axis layout to extend the comparison across measure values.

Examples of selection and combinations of members in asymmetrical axis configurations using the comparative analysis system 100 are described referring to FIGS. 7-12.

As shown in FIG. 7, in this example, a user specifies a selection set comprising two members with different parents but from the same level of the All Time hierarchy ([2000 Q 1] and [2001 Q 1]), and a third member from a different level of that hierarchy and also with a different parent ([2001/Nov]).

The user can further combine members from a different hierarchy of the same dimension into a second selection set, and then union-ed with the set of members in the previous step above. As shown in FIG. 8, the user selects two members [2001/Jan] and [Prior YTD] from a different hierarchy of the time dimension, the root member of the Prior YTD hierarchy, to form a second selection set, which is appended to the first selection set shown in FIG. 7. The comparative analysis system 100 thus can allow comparison of multiple levels of members with each other in a compact display that results from a direct manipulation of only those members of interest. This avoids the need for screen management gestures or the appearance of unnecessary members that distract from the analysis.

If comparison across multiple measures is desired, the comparative analysis system 100 allows nesting of a measure block inside the union of sets on the rows. As shown in FIG. 9, the user selects the measures [Order Profit] and [Order Cost] to be nested in the rows axis. In this case, while the default measure [Order Amount] is specified in the cross tab as shown at the top left corner, the cross-tab shows cell values showing the currently selected measures [Order Profit] and [Order Cost], and none of the cell values in the cross-tab reflect the measure [Order Amount] that is previously selected.

Similarly, the comparative analysis system 100 allows the union of a set from another dimension. As shown in FIG. 10, the user selects a member and its children from the Geography dimension [Australia] to be union-ed on the rows axis with the result of the example shown in FIG. 9. The cell values for the rows representing Australia and its children reflect the default measure [Order Amount], whereas the cell values for the remaining rows reflect either [Order Profit] or [Order Cost].

Where a union pre-exists, the comparative analysis system 100 allows nesting of different measure blocks inside each of the participants of the union. As shown in FIG. 11, the user selects second measure blocks [Average order Amount], [Average Order profit] and [Average Order Cost] are nested inside the [Australia] block on the rows axis from the example shown in FIG. 10. These additional measure blocks need not reflect the same measure instances or number of measures specified in the pre-existing measure block on the rows axis.

The comparative analysis system 100 allows nesting and/or union of additional blocks on either the row or column axes of the example shown in FIG. 11. As shown in FIG. 12, the user selects a sibling [Digital2Go Asia] to the member [Digital2Go Americas] has been union-ed on the columns axis.

The comparative analysis system 100 can allow the user to continuously extend this example cross-tab with other nest and union operations, subject to the constraints that a measure block can not be placed on the columns axis, Thus, the comparative analysis system 100 can provide a powerful analytical view that is easily constructed and modified, while economizing its display requirements.

Figure 5:
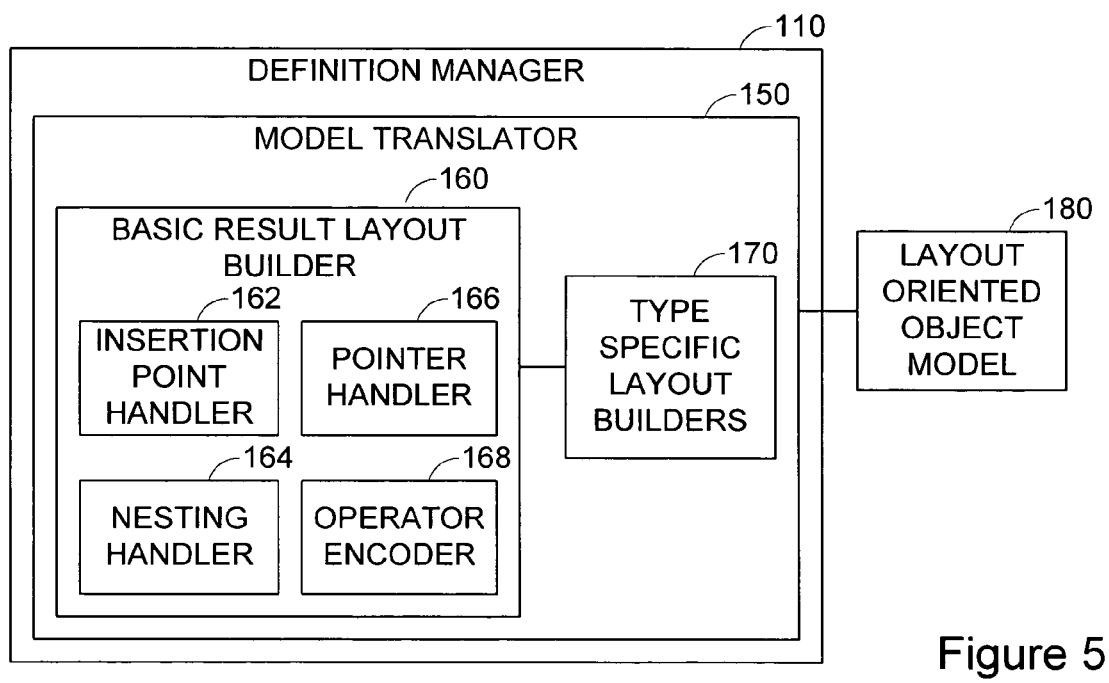
FIG. 5 is a block diagram showing an embodiment of a definition manager of the comparative analysis system.

Referring now to FIG. 5, the definition manager 110 is further described.

The multi-dimensional model 12 of the BI data analytical system 10 is typically an operator oriented object model that represents a layout of a report, such as an axis of a cross-tab, using a binary operator tree in order to compactly store objects representing the data source 30. In a binary operator tree, each leaf node represents a block in a cross-tab, and each non-leaf node represents an operator that determines how its sub-components trees are combined.

Figure 13:
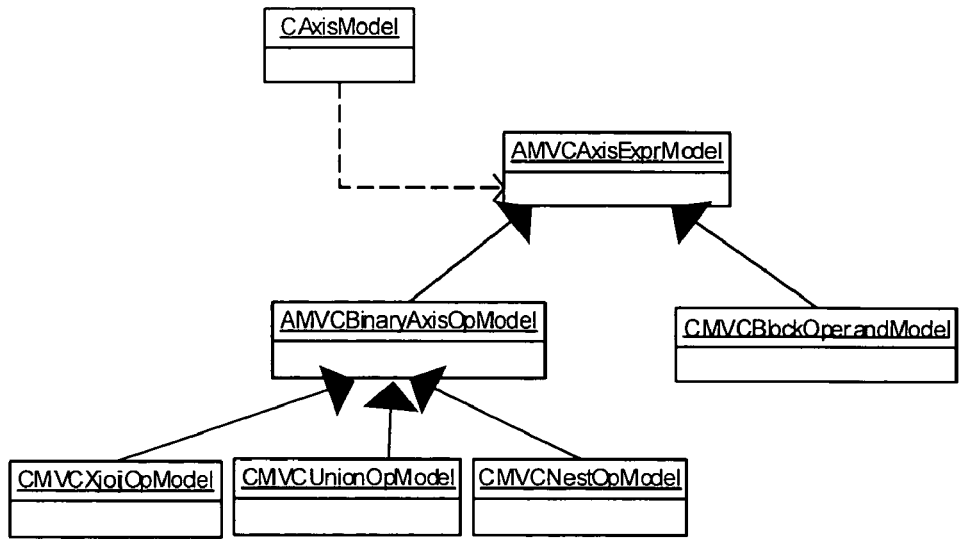
FIG. 13 is a diagram showing an example of an object model class hierarchy for a binary operator tree.

For example, FIG. 13 shows an example of a binary operator tree in such a compact operator oriented object model 12. In this example, the operator oriented object model 12 represents a cross-tab by a data matrix class, which contains a list of axis model objects CAxisModel. Each axis model object contains a pointer to an object of axis expression model type AMVCAxisExprModel. This object acts as the root node of the binary tree that represents the axis definition of a cross-tab. The binary tree can consist of operators and/or block objects, and thus, there are two classes that derive from the axis expression model class AMVCAxisExprModel. These two classes are a binary axis operator model class AMVCBinaryAxisOpModel and a block operand model class CMVCBlockOperandModel.

The binary axis operator model class is again a parent class that describes as subclasses the specific type of operators: crossjoin, union, or nest. The three subclasses are CMVCXjoinOpModel, CMVCUnionOpModel, and CMVCNestOpModel. There are no subclasses for the block operand model class. The different types of blocks are represented by flags and member in the block class itself.

As shown in FIG. 5, the definition manager 110 has a model translator 150 for translating the operator oriented object model 12 which represents a report layout using a binary operator tree into a layout oriented object model 180 which represents a report layout using a positional operator tree. The positional operator tree represents crossjoining and unioning by how the references to these blocks are placed in the definition. The positional operator tree does not use operators. Thus, grouping of sets of members is more easily accomplished, compared to the binary operator tree. Instead of defining operators that dictate how different sets of members are related, their relationships are implied based on the positioning of the elements in the layout specification.

Figure 14:
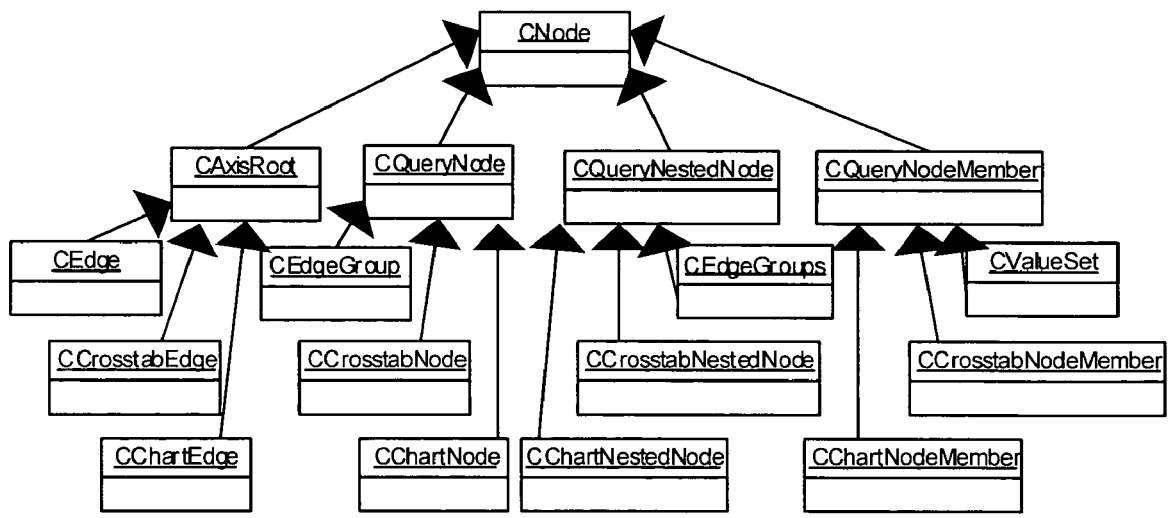
FIG. 14 is a diagram showing an example of an object model class hierarchy for a positional operator tree of a layout oriented model.

FIG. 14 shows an example of a positional operator tree of node classes of a layout oriented object model 180 representing a cross-tab. In order to represent various layout specification types for cross-tabs, chart and other graphical representations, the layout oriented object model defines an abstract parent result layout class CResultLayout for each of the different layout specification types. For example, in order to represent three layout specification types (e.g., query result definition (QRD) for a cross-tab in Cognos Analysis Studio, a layout for a cross-tab in Cognos Report Studio or Cognos Report Viewer, and a layout for a chart in Cognos Analysis Studio, Cognos Report Studio or Cognos Report Viewer), three classes are derived from the abstract parent result layout class. The derived classes are CQueryResultDefinition, CCrosstab, and CtemplateChart. The model translator 150, through the parent class, enforces the instantiation of methods to create and insert nodes in each of the respective object models.

There are many different types of nodes in the layout oriented object model. Each node has some differences, but all nodes have some similar traits. As such, a common base class is defined, called CNode, from which each node inherits indirectly. In order to represent a cross-tab, the model has four types of nodes: the root node of an axis, the query node that represents a block, the query nested node that represents a set of query nodes that are nested below a specific query node, and a query node member which represents a segment of a block. These four types of nodes are subclassed into the CAxisRoot, CQueryNode, CQueryNestedNode, and CQueryNodeMember classes. These node types are consistent for the different layout specification types that are generated, but each node type is subclassed into derived classes for each of the different layout specification types.

As shown in FIG. 14, for the above example having three different layout specification types, three subclasses of CAxisRoot are CEdge (for the QRD), CCrosstabEdge (for report specifications), and CChartEdge (for chart specifications). Three subclasses of CQueryNode are CEdgeGroup (for the QRD), CCrosstabNode (for report specifications), and CChartNode (for chart specifications). The three subclasses of CQueryNestedNode are CEdgeGroups (for the QRD), CCrosstabNestedNode (for report specifications), and CChartNestedNode (for chart specifications). The three subclasses of CQueryNodeMember are CValueSet (for the QRD), CCrosstabNodeMember (for report specifications), and CChartNodeMember (for chart specifications).

Each CResultLayout derived class maintains a pointer to one of the three derived CAxisRoot derived classes. Nodes for a cross-tab can only contain nodes that are appropriate for the QRD, nodes contained by a report edge can only contain nodes appropriate for a report specification, and nodes contained by a chart edge can only contain nodes appropriate for a chart specification.

The model translator 150 translates the operator oriented object model 12 into the layout oriented object model 180. The translation happens any time that the query needs to be generated. The subjects of the translation are all the block components of an instance of the operator oriented object model.

The model translator 150 uses a combination of polymorphism and recursion to perform a single iteration through the operator oriented object model 12. While iterating through the nodes in the object model 12, a corresponding layout oriented object model 180 is constructed that represents the final specification that is submitted to the BI data analytical system 10.

As shown in FIG. 5, the model translator 150 has a basic result layout builder 160 and one or more type specific layout builders 170.

The basic layout builder 160 traverses the operator oriented object model 12 and translates it into the layout oriented object model 180 using a relevant type specific layout builder 170. The basic result layout builder 160 provides result layout features common to different report layout types. The basic layout builder 160 has an insertion point handler 162 and a nesting handler 164. An insertion point handler 162 locates insertion points which are candidates of nodes for insertion of nesting underneath by the nesting handler 164, as further described below.

Each type specific layout builder 170 is associated with a layout specification type, i.e., a query type. Each type of specific layout builder 170 maintains query type specific building part of the algorithm or method of building a result layout. This query type specific building part is code that knows the correct types of nodes to insert into the positional operator tree of the layout oriented object model 180.

Figure 15:
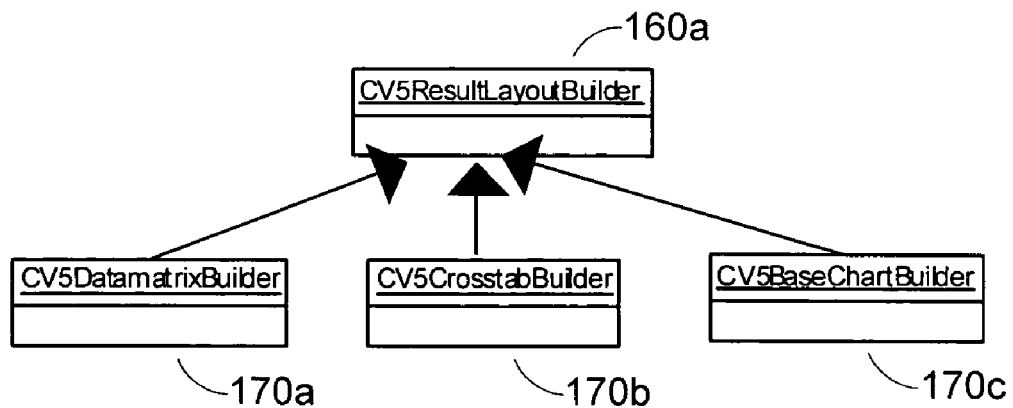
FIG. 15 is a diagram showing an example of an object model class hierarchy for a result layout builder.

In the above example with three layout specification types, as shown in FIG. 15, the model translator 150 has a basic result layout builder class CV5ResultLayoutBuilder 160*a* and three different builder classes 170*a*-170*c*, one for each layout specification type. The three builder classes are CV5DatamatrixBuilder 170*a* responsible for constructing the QRD, CV5CrosstabBuilder 170*b* responsible for constructing the report specification, and CV5BaseChartBuilder 170*c* responsible for constructing the chart specification with the appropriate nodes, respectively.

The basic result layout builder 160 is a common base class from which the type specific layout builders classes 170 inherit. Thus, the definition manager 110 can maintain synchronization among the different layout types.

The basic result layout builder 160 has a pointer handler 166. The pointer handler 166 provides a pointer to a particular result layout object for the query type in question.

The basic result layout builder 160 also has an operator encoder 168. The operator encoder 168 maintains a single set of methods that are responsible for encoding the binary operators in the operator oriented object model 12. The operators in the binary oriented object model dictate the position of the objects in the layout generated during the encoding process.

The basic result layout builder 160 also, through pure virtual methods, enforces the definition of methods in the subclass builders 170, to encode the blocks since the definition of the methods is a query-specific task. The layout builder reads each block definition and outputs the corresponding layout object.

To translate the operator oriented object model 12 to the layout oriented object model 180, the basic result layout builder 160 uses a recursive descent style of iteration in prefix order. In the operator oriented object model 12, each non-leaf node is an operator, and each leaf node is a block definition as shown in FIG. 13. The basic result layout builder 160 processes LHS (left hand side) of each binary operator node first, and then processes the RHS (right hand side) afterwards.

As each non-leaf node in the operator oriented object model 12 is reached, the basic result layout builder 160 completes specific tasks based on what type of operator the node represents. These tasks are centered mainly around the management of "insertion points".

Figure 16:
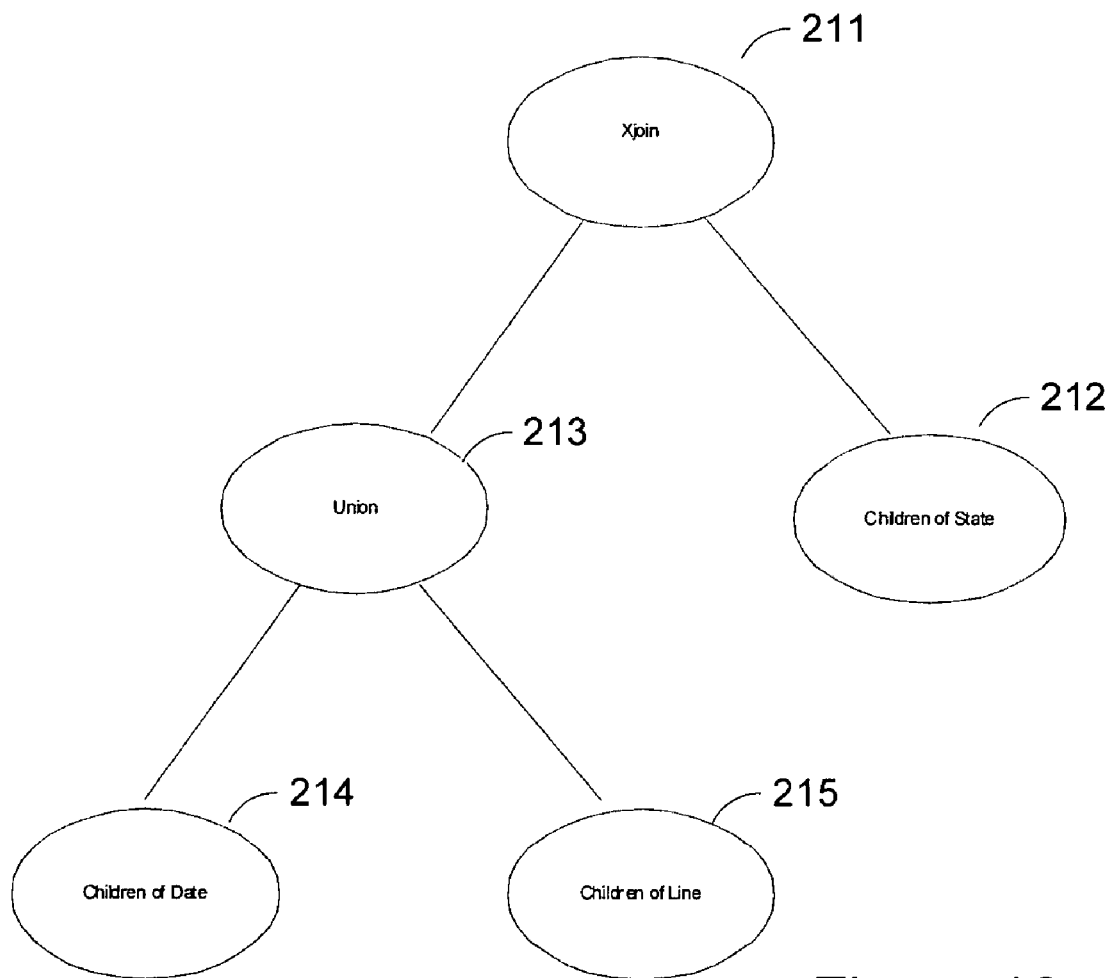
FIG. 16 is a diagram showing an example of a binary operator tree.

Insertion points are lists of nodes that are candidates for nesting beneath. An example of insertion points is described referring to FIGS. 16 and 17. FIG. 17 shows a cross-tab 200 having a block crossjoined against two unioned blocks on the row axis. In a cross-tab 200 shown in FIG. 17, the operator oriented object model 12 appears as a binary operator tree 210 as shown in FIG. 16. The binary operator tree 210 has a crossjoin node 211 which has a non-leaf node "children of State" 212 and the union node 213, which in turn has non leaf nodes "children of Date" 214 and "children of Line" 215.

In a positional operator tree, there is a need to repeat the definition of "children of State" under each of the other two block definitions. Thus, when the basic result layout builder 160 traverses an object model union operator on the LHS, it creates an insertion point for each of the blocks involved in the union operation. That is, the basic result layout builder 160 inserts the "children of State" block under both "children of Date" and "children of Line". When the LHS has a crossjoin operator instead of a union, the basic result layout builder 160 manages only the RHS of that crossjoin as an insertion point, since in this case the "children of State" needs to be inserted under "children of Line" only. The basic result layout builder 160 performs the same processes for nesting operators.

In general, each time the basic result layout builder 160 traverses the LHS of an operator node, the basic result layout builder 160 creates a list of insertion points for LHS under which the RHS will need to be inserted. The RHS then subsequently becomes the LHS of an operator as the basic result layout builder 160 climbs higher up the binary operator tree of the operator oriented object model 12. In such a case, the basic result layout builder 160 replaces the original list of insertion points from the previous LHS with a new set of insertions points defined by the original RHS. It is the responsibility of each operator node to determine how to manage the insertion points as the basic result layout builder 160 moves from the LHS to the RHS. Each operator node replaces the previous list of insertion points with the new list of insertion points after traversing its RHS.

Thus, the basic result layout builder 160 rewinds a binary operator tree in the compact operator-oriented object model 12 of the BI analytical system 10, and represents it in a positional operator tree in a layout-oriented object model 180 that is used for reporting.

In the example cross-tab 200 shown in FIG. 17, a binary tree representation in XML may appear as follows.

```
<axis elcid="uuid:00000228434c1ae20000057d" name="rowEdge">
    <axisexpr>
        <axisop type="xjoin">
            <axisop type="union">
                <block elcid="uuid:00000228434c1ae80000058d"/>
                <!--children of
Date -->
                <block elcid="uuid:00000228434c1af0000005b6"/>
                <!--children of Line
-->
            </axisop>
            <block elcid="uuid:00000228434c1af5000005cb"/>
            <!--children of State -->
        </axisop>
    </axisexpr>
</axis>
```

The "children of State" block is crossjoined against a union of the "children of Date" block and the "children of Line" block.

The translated positional operator tree representation of the cross-tab 200 becomes as follows:

```
<edge edgeID="1" name="uuid:57d">
    <edgeGroups>
        <edgeGroup>
            <valueSets>
                <valueSet name="block:58d tag:visible"
refDataItem="block:58d tag:visible"/>
                <valueSet name="block:58d tag:hidden"
refDataItem="block:58d tag:hidden"/>
                <valueSet name="block:58d tag:summary"
refDataItem="block:58d tag:summary"/>
            </valueSets>
            <edgeGroups>
                <edgeGroup>
                    <valueSets>
                        <valueSet name="block:5cb tag:visible"
refDataItem="block:cb tag:visible"/>
                        <valueSet name="block:5cb tag:hidden"
refDataItem="block:cb tag:hidden"/>
                        <valueSet name="block:5cb tag:summary"
refDataItem="block:5cb tag:summary"/>
                    </valueSets>
                </edgeGroup>
            </edgeGroups>
        </edgeGroup>
        <edgeGroup>
            <valueSets>
                <valueSet name="block:5b6 tag:visible"
refDataItem="block:5b6 tag:visible"/>
                <valueSet name="block:5b6 tag:hidden"
refDataItem="block:5b6 tag:hidden"/>
                <valueSet name="block:5b6 tag:summary"
refDataItem="block:5b6 tag:summary"/>
            </valueSets>
            <edgeGroups>
                <edgeGroup>
                    <valueSets>
                        <valueSet name="block:5cb tag:visible"
refDataItem="block:5cb tag:visible"/>
                        <valueSet name="block:5cb tag:hidden"
refDataItem="block:5cb tag:hidden"/>
                        <valueSet name="block:5cb tag:summary"
refDataItem="block:5cb tag:summary"/>
                    </valueSets>
                </edgeGroup>
            </edgeGroups>
        </edgeGroup>
    </edgeGroups>
</edge>
```

In this positional operator tree representation, the edgeGroup element represents a collection of segments that comprise a "block" in the binary operator tree. An edgeGroup may contain some or all of the segments of a block. Each segment is represented by a valueSet element as seen in this positional operator tree representation.

In order to nest different segment or blocks below one another, such as in the cross-tab 200 where "children of State" is nested below the other two blocks, an element of the type "edgeGroups" is placed as a sub-element of the outer edgeGroup element. The positional operator tree representation makes no distinction between nesting blocks of different dimensions (a.k.a. crossjoining) from nesting blocks of the same dimension (a.k.a. single dimension nesting). In contrast, the object of the operator oriented object model 12 makes a distinction, due to the fact that the two types of nesting are treated very differently in the user interface of the BI analytical system 10.

In the positional operator tree representation, the "children of State" block definition is repeated for each outer block against which it is crossjoined. With the operator oriented object model 12, this is unnecessary due to the nature of the representation. However, the repetition is used for various types of reporting purposes in different BI data analytical systems. The model translator 150 can provide such repetitions so that various types of reporting can be provided using operators.

Referring back to FIG. 2, the comparative analysis system 100 may also have a hierarchy manager 140. The hierarchy manager 140 allows one or more selection sets containing individually selected members to be hierarchized, and balances the members in the hierarchized selection sets in a report.

Figure 6:
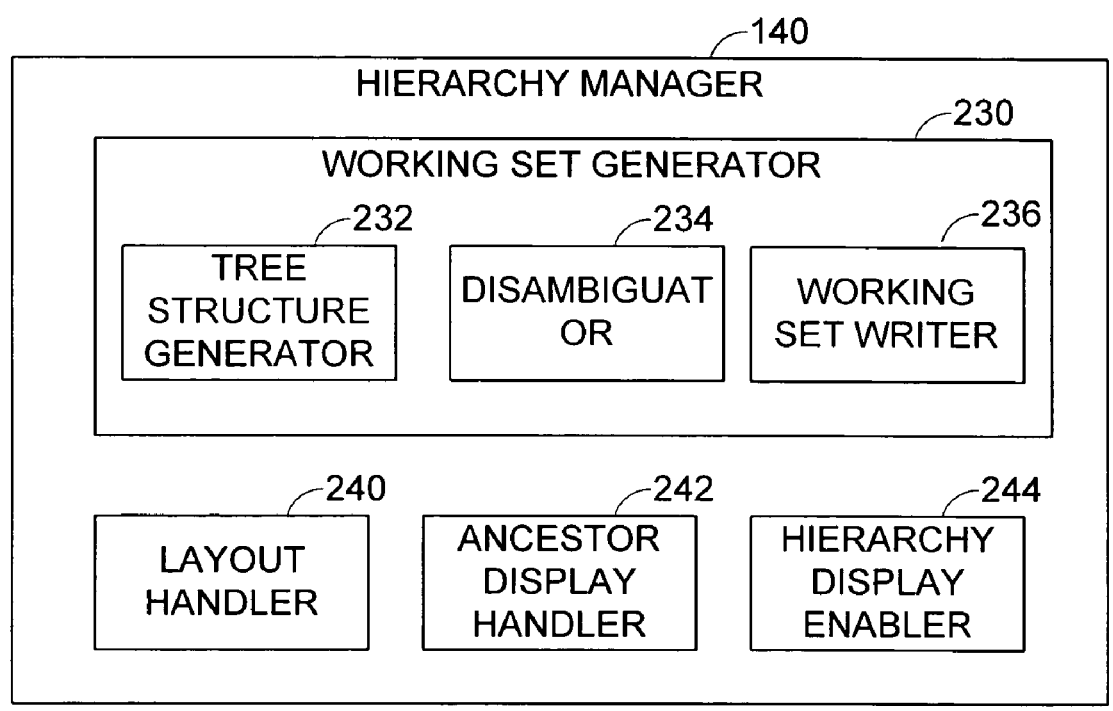
FIG. 6 is a block diagram showing an embodiment of a hierarchy manager of the comparative analysis system.

FIG. 6 shows an embodiment of the hierarchy manager 140. The hierarchy manager 140 has a working set generator 230, a layout handler 240, an ancestor display handler 242 and a hierarchy display enabler 244. The working set generator 230 has a tree structure generator 232, disambiguator 234 and a working set writer 236.

The hierarchy display enabler 244 allows a user to enable or disable hierarchize property of a selection set. When the hierarchize property is enabled, the layout handler 240 provides hierarchy layout features to the members in the selection set in a report, depending on the selection set. The ancestor display handler 242 automatically adds one or more ancestor members to the selection set, recursively, as necessary depending on the members in the selection set, until a first common ancestor member is reached. Ancestor members may be parent members or other ancestor members in a higher hierarchy level. Thus, the report is balanced and confusion or ambiguity of the selected members can be removed For example, when members have different parent members in the same dimension but are at the same dimensional level, these members are considered as cousins. When the hierarchy manager 40 hierarchizes a selection set of members that are cousins, the ancestor display handler 242 automatically adds their parent member into the set to balance the display of the dimension's hierarchy tree. Thus, the cousin members can be disambiguated.

These ancestor members are phantom members. The ancestor display handler 242 shows these ancestor members in the selection set only when the selection set has its hierarchize property enabled. This property also triggers a change in formatting of the displayed members by the layout handler 240. When this hierarchize property is disabled, the set is said to be flattened, and the parent/ancestor members are removed from the set.

Thus, the hierarchy manager 140 disambiguates members by dynamically and automatically introducing ancestor members into the set to provide hierarchical orientation for the selected members. This disambiguation is a property of the selection set in its entirety rather than applying to individual members, and is enabled optionally. While this disambiguation adds to the number of members displayed, it works in the context of an already compacted display where germane members are displayed. Thus, this disambiguation facilitates comparative analysis of the selected members.

The hierarchy manager 140 is further described using examples. FIG. 18 shows an example initial cross-tab where the hierarchize property is enabled and the user inserted an individual member Calgary on the rows axis set in the cross-tab. The user inserts Edmonton as shown in FIG. 19, and further inserts San Jose as shown in FIG. 20. When the user inserts Canada, the hierarchy manager 140 automatically formats rows with indentation to represent the relative level of each displayed members, and automatically inserts ancestor member USA to disambiguate the cities of multiple country members. When the user inserts California, the hierarchy manager 140 automatically inserts parent member Alberta to disambiguate the cities of multiple state/province members.

Alternatively, the hierarchy manager 140 may automatically add the parent member when the hierarchize property is enabled. In this case, the above scenario becomes as shown in FIGS. 23-27. That is, the user inserts the individual member Calgary on the rows axis set as shown in FIG. 23. When the user inserts Edmonton, the hierarchy manager 140 determines the first common ancestor member (i.e., the parent member) Alberta and inserts it automatically as shown in FIG. 24. When the user inserts San Jose, the hierarchy manager 140 removes Alberta as it is no longer the first common ancestor member, and automatically inserts the new first common ancestor member North America. When the user inserts Canada, the hierarchy manager 140 automatically inserts USA to disambiguate the city members. When the user inserts California, the hierarchy manager 140 automatically inserts Alberta to disambiguate the state/province members.

The hierarchy manager 140 provides the hierarchize property as a property of a selection set block. A selection set block is a block comprised of specific members from the same dimensional hierarchy. The working set generator 230 of the hierarchy manager 140 generates a working set of axis expression members for such blocks. The working set is a set of members that will be displayed. Thus, blocks have two lists of axis expression members: the selection set and the working set.

The working set generator 230 generates the working set when any axis operator expression is initialized or when the axis operator expression for the selection set block definition is changed. When the hierarchize property is not enabled, the working set generation operation is just a straight copy of the selection set.

The working set generator 230 performs the hierarchical generation of the working set is as follows: The working set generator 230 verifies precondition, i.e., ensures that all members in the selection set belong to the same hierarchy. If not, then the working set generator 230 performs a simple copy of the selection set, and leaves the hierarchize property enabled. This resolves to the selection set with no additional members, but the layout handler 240 applies a hierarchical display layout, e.g., indentation.

The working set generator 230 inserts the nodes from the selection set into a tree structure where the parent of an object is its closest ancestor, i.e., most immediate ancestor, which exists in the dimensional object model 12 at that time.

The working set generator 230 disambiguates the nodes. It walks through each node checking to see if the children of a node all belong to the same level. If they do not, then the working set generator 230 uses the object at the highest level, and for all other children if a parent exists at that level, the working set generator 230 inserts the highest level object in a working set.

The working set generator 230 creates a working set as it traverses the tree from left to right and bottom to top, by writing the nodes to the working set. The working set is provided to the BI data analytical system 10 for displaying a report.

Thus, the hierarchy manager 140 provides the ability to dynamically determine and automatically introduce into the correct location within a selection set those ancestor members required to disambiguate the existing members of the selection set. This can be also applied within the scope of a single edge of a cross-tab, permitting the opposite edge to be used for supplying additional dimensional context relevant to the comparison.

The comparative analysis system of the invention may be implemented by any hardware, software or a combination of hardware and software having the above described functions. The software code, instructions and/or statements, either in its entirety or a part thereof, may be stored in a computer readable memory. Further, a computer data signal representing the software code, instructions and/or statements may be embedded in a carrier wave may be transmitted via a communication network. Such a computer readable memory and a computer data signal and/or its carrier are also within the scope of the invention, as well as the hardware, software and the combination thereof.

While particular embodiments of the invention have been shown and described, changes and modifications may be made to such embodiments without departing from the scope of the invention. For example, the elements of the comparative analysis system are described separately, however, two or more elements may be provided as a single element, or one or more elements may be shared with other components in one or more computer systems.

What is claimed is:

1. A method of providing comparative analysis of business intelligence data represented by a multi-dimensional model, the method comprising:

independently defining, by a definition manager in a comparative analysis system, a plurality of dimensional members of a data source;

receiving, by an operation manager in the comparative analysis system, user input selecting a set of dimensional members of interest and at least one operator to manipulate the selected set of members based on the selected at least one operator, wherein the set of dimensional members of interest comprise a first dimensional member of interest having a given dimension and a given level in a hierarchy of the given dimension and a second dimensional member of interest having a different dimension from the given dimension or a different level in the hierarchy from the given level in the hierarchy;

applying, by the operation manager, the at least one operator to the selected set of dimensional members of interest to form a manipulated set of dimensional members of interest; and placing, by a display manager in the comparative analysis system, the manipulated set of dimensional members in a report so that the manipulated set of dimensional members are displayed adjacently based on the operator to facilitate comparative analysis, wherein defining a plurality of dimensional members of a data source comprises translating a multi-dimensional model defining a report layout as a binary operator tree into a layout oriented object model that defines the report layout in a positional operator tree.

2. The method of claim 1, wherein the at least one operator comprises a union operator, a cross-product operator, or a dot-product operator;

wherein applying the at least one operator to the selected set of dimensional members of interest comprises combining, by the operation manager, the selected set of dimensional members using the union operator, cross-product operator, or dot-product operator to form the manipulated set of dimensional members.

3. The method of claim 1,
wherein the selected set of dimensional members of interest comprise at least one measure.

4. The method of claim 1, wherein placing the manipulated set of dimensional members in a report comprises placing the manipulated set of dimensional members in a cross-tab in an asymmetrical axis configuration based on the selected set of dimensional members and the selected at least one operator.

5. The method of claim 1, wherein translating a multi-dimensional model comprises:
providing layout features common to different report types to build a result layout based on the selected at least one operator; and
providing layout features specific to at least one specific report type.

6. The method of claim 5, wherein providing layout features common to different report types comprises:
analyzing nodes of the multi-dimensional model;
creating as insertion points a list of candidate nodes under which a nest operation is performed; and
nesting nodes in the insertion points.

7. The method of claim 1, wherein translating the multi-dimensional model further comprises:
managing a pointer to a result layout object for a query in the layout oriented object model depending on a report type of the query; and
encoding the selected at least one operator in the layout oriented object model.

8. The method of claim 1, further comprising:
responsive to a hierarchize property for a selection set containing one or more of the selected set of dimensional members of interest being enabled, balancing, by a hierarchy manager in the comparative analysis system, displayed members in the report.

9. The method of claim 8, further comprising automatically adding a hierarchical display layout for visually representing levels of the displayed members.

10. The method of claim 8, further comprising automatically adding one or more ancestor members of the selected set of dimensional members of interest to the report.

11. The method of claim 10, wherein adding one or more ancestor members comprises adding a first common ancestor of the selected set of dimensional members of interest.

12. The method of claim 8, further comprising receiving user input to enable or disable the hierarchize property for one or more of the selected set of dimensional members of interest.

13. A computer program product comprising a computer recordable medium having a computer readable program recorded thereon, wherein the computer readable program, when executed on a computing device, causes the computing device to:
independently define, by a definition manager in a comparative analysis system, a plurality of dimensional members of a data source;
receive, by an operation manager in the comparative analysis system, user input selecting a set of dimensional members of interest and at least one operator to manipulate the selected set of members based on the selected at least one operator, wherein the set of dimensional members of interest comprise a first dimensional member of interest having a given dimension and a given level in a hierarchy of the given dimension and a second dimensional member of interest having a different dimension from the given dimension or a different level in the hierarchy from the given level in the hierarchy;
apply, by the operation manager, the at least one operator to the selected set of dimensional members of interest to form a manipulated set of dimensional members of interest; and
place, by a display manager in the comparative analysis system, the manipulated set of dimensional members in a report so that the manipulated set of dimensional members are displayed adjacently based on the operator to facilitate comparative analysis,
wherein defining a plurality of dimensional members of a data source comprises translating a multi-dimensional model defining a report layout as a binary operator tree into a layout oriented object model that defines the report layout in a positional operator tree.

14. The computer program product of claim 13, wherein the computer readable program further causes the computing device to:
responsive to a hierarchize property for a selection set containing one or more of the selected set of dimensional members of interest being enabled, balance, by a hierarchy manager in the comparative analysis system, displayed members in the report.

15. The computer program product of claim 14, wherein the computer readable program further causes the computing device to:
automatically add one or more ancestor members of the selected set of dimensional members of interest to the report.

16. A comparative analysis system, comprising:
a processor; and
a memory coupled to the processor, wherein the memory comprises instructions which, when executed by the processor, cause the processor to:
independently define, by a definition manager, a plurality of dimensional members of a data source;
receive, by an operation manager, user input selecting a set of dimensional members of interest and at least one operator to manipulate the selected set of members based on the selected at least one operator, wherein the set of dimensional members of interest comprise a first dimensional member of interest having a given dimension and a given level in a hierarchy of the given dimension and a second dimensional member of interest having a different dimension from the given dimension or a different level in the hierarchy from the given level in the hierarchy;
apply, by the operation manager, the at least one operator to the selected set of dimensional members of interest to form a manipulated set of dimensional members of interest; and
place, by a display manager, the manipulated set of dimensional members in a report so that the manipulated set of dimensional members are displayed adjacently based on the operator to facilitate comparative analysis,
wherein defining a plurality of dimensional members of a data source comprises translating a multi-dimensional model defining a report layout as a binary operator tree into a layout oriented object model that defines the report layout in a positional operator tree.

17. The comparative analysis system of claim 16, wherein the instructions further cause the processor to:
responsive to a hierarchize property for a selection set containing one or more of the selected set of dimensional members of interest being enabled, balance, by a hierarchy manager, displayed members in the report.

18. The comparative analysis system of claim 17, wherein the instructions further cause the processor to:
automatically add one or more ancestor members of the selected set of dimensional members of interest to the report.

* * * * *